United States Patent [19]
Akiyama

[11] Patent Number: 5,306,997
[45] Date of Patent: Apr. 26, 1994

[54] DRIVE SYSTEM FOR TURBOCHARGER WITH ROTARY ELECTRIC MACHINE

[75] Inventor: Kazunari Akiyama, Machida, Japan

[73] Assignee: Isuzu Motors Limited, Tokyo, Japan

[21] Appl. No.: 909,039

[22] Filed: Jul. 6, 1992

[30] Foreign Application Priority Data

Jul. 6, 1991 [JP] Japan .................................. 3-192456

[51] Int. Cl.⁵ ............................................. F02B 37/00
[52] U.S. Cl. .................................... 318/721; 318/722; 60/39.34; 60/608
[58] Field of Search ...................... 60/39.01, 39.34, 597, 60/608; 318/705, 721, 722, 729, 798, 799

[56] References Cited

U.S. PATENT DOCUMENTS

| 4,361,792 | 11/1982 | Davis, Jr. et al. | 318/729 |
| 4,731,571 | 3/1988 | Donley | 318/702 |
| 4,731,572 | 3/1988 | Bolie | 318/721 |
| 4,769,993 | 9/1988 | Kawamura | 60/597 |
| 4,833,887 | 5/1989 | Kawamura et al. | 60/608 |
| 4,878,347 | 11/1989 | Kawamura | 60/608 |
| 5,105,624 | 4/1992 | Kawamura | 60/608 |

FOREIGN PATENT DOCUMENTS 0079100  5/1983  European Pat. Off. .
0159146  10/1985  European Pat. Off. .

Primary Examiner—Bentsu Ro
Attorney, Agent, or Firm—Staas & Halsey

[57] ABSTRACT

A system for driving an electric machine mounted on the main shaft of a turbocharger is provided. The electric machine can function as a generator or as an electric motor. The system for driving the machine includes a positional sensor, a phase detective mechanism, a first calculation mechanism and a second calculation mechanism. The positional sensor mechanically predicts an initialized position of phase of the electric machine. The phase detective mechanism electrically predicts the initialized position of phase of the electric machine. The first calculation mechanism calculates the difference between the mechanically predicted initialized position and the electrically predicted initialized position. The second calculation mechanism add the difference calculated by the first calculation mechanism to the mechanically predicted initialized position of phase to derive an initialized position of phase to be used for producing AC electric power to drive the electric machine when it functions as an electric motor.

2 Claims, 5 Drawing Sheets

DRIVE SYSTEM FOR TURBOCHARGER WITH ROTARY ELECTRIC MACHINE

BACKGROUND OF THE INVENTION

1. Field of the Invention

The present invention relates to a drive system for a turbocharger with a rotary electric motor/generator "machine" in general, and more particularly, to a drive system which can easily generate a phase of an initialized position to be supplied to a driving AC electric power source of the AC motor/generator.

2. Description of the Related Art

In recent years, there have been proposed various systems for recovering exhaust energy by transforming rotary force of an exhaust turbine into electric power energy. Japanese Laid-Open Patent Publication No. 63-30213 discloses, as one such system, a system for a turbocharger with a rotary electric machine having a turbine rotatable by the energy of exhaust gases emitted from an internal combustion energy and a compressor coupled directly to the turbine, for compressing intake air and supplying compressed intake air to the engine. An AC motor coupled directly to the rotatable shaft of the turbine operates at times as a generator, and exhaust energy obtained from the turbine through the AC motor is recovered as DC electric power for the generated electric power. When the engine operates at low speeds, the exhaust gases emitted from the engine are under lower pressure and turbocharged pressure from a compressor to the engine declines. At this point recovered and stored DC electric power is converted into AC electric power by an inverter. For operating the engine, the AC voltage is applied to the AC motor/generator, which assists in the rotation of a compressor for obtaining necessary supercharged air.

The above drive system for a turbocharger with the rotary electric machine has small magnet pieces mounted on an initialized position of the back side of compressor impeller and has a picking-up coil mounted on the turbine housing opposite the permanent magnet pieces. When an AC motor generator operates as a motor, polyphase current is generated and supplied to the AC motor generator. The polyphase current corresponds to a signal of initialized position supplied from a position sensor which is composed of the above permanent magnet pieces and the coil. That is, a frequency of supplied electric power is read with a pulse interval of a signal of initialized position from the positional sensor. Then a first phase starts, as the signal of initialized position functions as a trigger. Successively, other phases start at predetermined phase differences.

Since a positional adjustment between the mechanically rotary initialized position of a positional sensor and an electrically initialized position of phase is only executed when the system and the turbocharger with the rotary electric machine are newly loaded on a vehicle, or when a portion of the turbocharger with the rotary electric machine or the drive system are replaced, position adjustment is not achieved when a motor vehicle is operating.

A rotor of the AC motor generator is screwed on a rotational shaft, and since the rotational speed of the rotational shaft reaches nearly 200,000 rpm, the rotor may get out of position (slip). When the rotor gets out of the position, it brings about not only inefficient operation but also damage of the inverter. In addition, every replacement of the turbocharger with the rotary electric machine and the system for driving requires time for the positional adjustment.

SUMMARY OF THE INVENTION

In order to overcome the above described problem, it is an object of the present invention to provide a system for driving a turbocharger with a rotary electric machine in which a positional adjustment is made between a mechanically rotary initialized position of a positional sensor and an electrically initialized position of a phase. With respect to the system for driving the turbocharger with the rotary electric machine, it has a turbine rotatable by the exhaust gases emitted from the engine and a compressor rotatable by the turbine. An AC motor generator is positioned on the rotational shaft coupling the turbine and the compressor.

It is a further object of the present invention to provide a system for driving a turbocharger with the rotary electric machine having a turbine rotatable by the exhaust gases emitted from the engine and a compressor rotatable by a turbine, and an AC motor generator positioned on the rotational shaft coupling the turbine and the compressor. The system comprises a positional sensor for detecting a mechanically rotary initialized position of the rotatable shaft, a phase detective means for detecting an electrically initialized position of a phase of the AC motor generator, and a first calculation means for calculating the difference between the rotary initialized position as determined from a positional sensor, and a phase initialized position determined from the phase detective means. The system further comprises a second calculation means for calculating the phase initialized position of an AC electric power source used for driving the AC motor generator. This is done by adding the rotary initialized position obtained from the positional sensor to the difference calculated by the first calculation means.

When the rotor is rotated in a case where the AC motor generator operates as a generator, measuring the phase of polyphase AC voltage provided to a terminal of the power source of AC motor generator (battery), or measuring the mechanical position of the AC motor generator with the positional sensor allows initiation of the polyphase AC voltage used for operating the AC motor generator as a motor.

Other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENT

Figure 1:
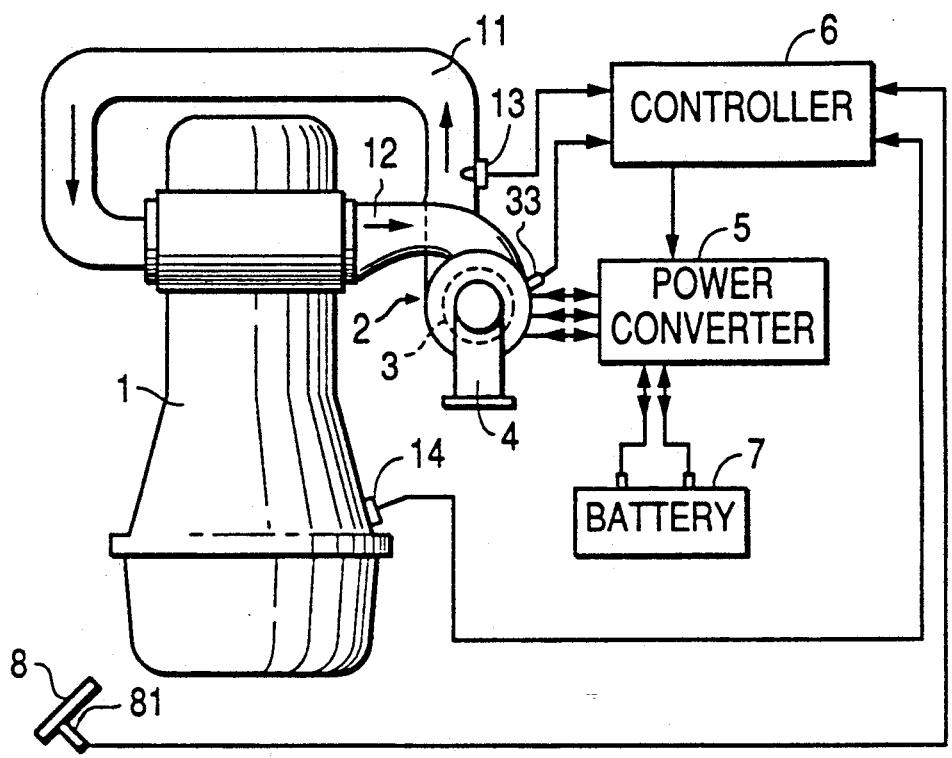
FIG. 1 is a block diagram of a system for driving a turbocharger with a rotary electric machine according to the present invention.
Figure 2:
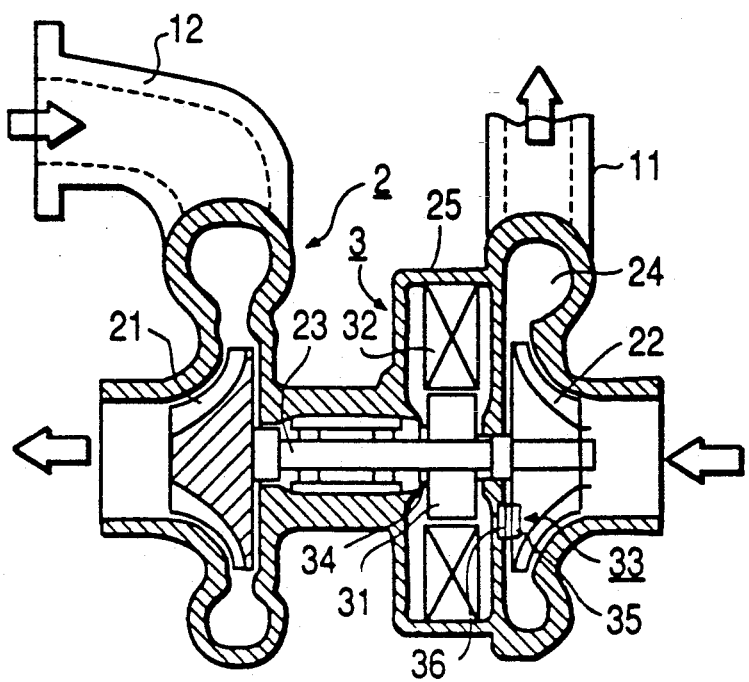
FIG. 2 is a longitudinal cross-sectional view of a composition of a turbocharger according to the present invention.

As shown in FIGS. 1 and 2, reference numeral 1 denotes an engine. A motor vehicle (not shown) is driven by an internal combustion engine supplied with air drawn from intake pipe 11 and supplied fuel. Exhaust gases from combustion rotate turbine 21 and are supplied to turbocharger 2 through exhaust pipe 12. Compressor 22, coupled directly to the rotatable shaft 23 of turbine 21, compresses air by torque supplied by turbine 21 which is rotatable by exhaust gases. The turbine 21 supplies compressed air to the engine from intake pipe 11 through scroll 24 to thereby increase output of the engine operated by compressor 22. Signals from a boost pressure sensor 13 for detecting the pressure of the supercharged air, which sensor is mounted on the interior of pipe 11, and from a rotational sensor of the engine 14 for detecting the rotational speed of the engine are transmitted to a controller which will be described in detail later.

Rotary electric machine 3 as an AC motor generator has a rotor 31 fixed on the rotational shaft 23 by screw 34 and a stator 32 mounted on the interior wall of housing 25 of turbocharger 2. Rotor 31, for instance, has a field magnet of a permanent magnet and comprises a three phase synchronous rotary electric machine together with the stator 32. When compressor 22 is not sufficiently supercharged by the drive force of turbine 21 propelled by exhaust energy, supercharging of compressor 22 is assisted by supplying electric power to the rotary electric machine 3. As shown in FIG. 2, positional sensor 33 is comprised of permanent magnet piece 35 and coil 36 for detecting the rotational speed of the rotary electric machine 3. Positional sensor 33 detects the initialized position by detecting the rotational impeller speed of compressor 22. The detected positional signal PS is transmitted to a controller 6. In FIG. 1, positional sensor 33 is indicated roughly where it would be positioned, simply in accordance with the diagram, without showing the details of positional sensor 33. Exhaust pipe 4 discharges exhaust gases from turbocharger 2 to the atmosphere.

The electric power converter 5 outputs electric power from battery 7 after conversion to a predetermined frequency AC electric power. This power rotates the rotary electric machine 3. Power converter 5 also stores the generated electric power to the battery 7 after rectification when the rotary electric machine generates electric power. Electric power converter 5 has a rectifier for rectifying the AC electric power output from the rotary electric machine 3 and a power device such as an inverter for converting the DC electric power of battery 7 to the AC electric power having the predetermined frequency. A control command for achieving the predetermined frequency is supplied from a controller 6.

An accelerator pedal 8 is operated by a driver of the motor vehicle to control the rate of fuel being supplied to the engine 1. An accelerator pedal movement sensor 81 mounted on the accelerator pedal 8 detects the amount of depression of the accelerator pedal 8 and supplies a detected signal to the controller 6.

The controller 6 comprises a microcomputer including a central processing unit for executing arithmetic operations, various memories for storing the results of arithmetic operations and for storing a control program, and input/output ports. When detected signals are supplied from the boost sensor 13, the engine speed sensor 15, the positional sensor 33, and the accelerator pedal movement sensor 81 to the controller 6, the controller 6 effects, according to the control program, arithmetic operations on the supplied signals and supplies a central command to the inverter 5 for converting the DC electric power to AC electric power having a predetermined frequency.

Figure 3:
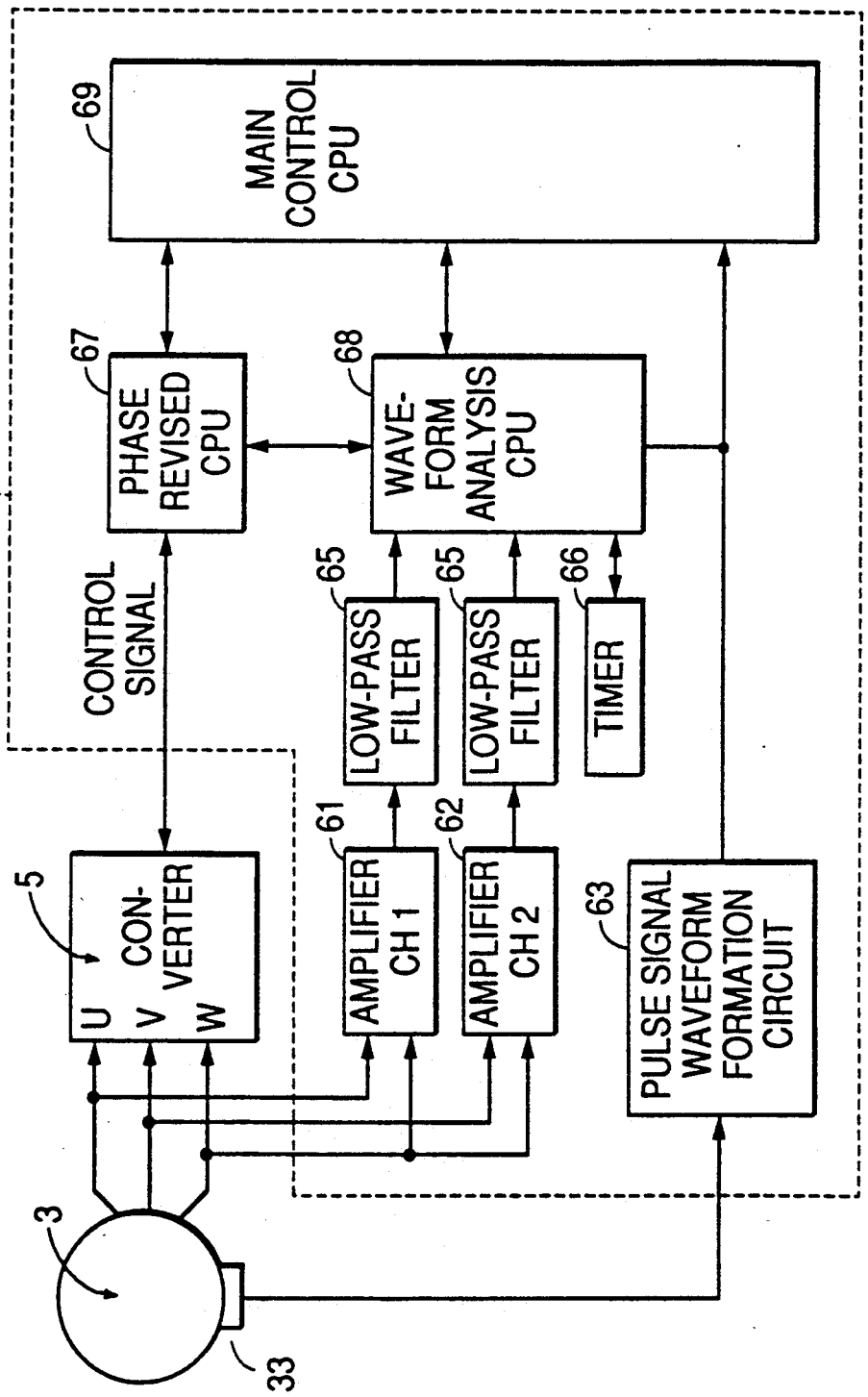
FIG. 3 is a block diagram of a system for driving a rotary electric machine.

FIG. 3 is a block diagram illustrating the rotary electric machine 3 as well as positional sensor 33, electric power converter 5 and controller 6. Thus, FIG. 3 illustrates part of a system for driving a turbocharger with the rotary electric machine. As shown in FIG. 3, controller 6 has an amplifier 61 insulated between a primary and a secondary circuit for amplifying voltage of U phase against W phase and an amplifier 62 insulated between a primary and a secondary circuit for amplifying voltage of V phase against W phase. The input end of amplifiers 61 and 62 is connected to three phase electric power source terminals of the rotary electric machine. A luminous element and a receiver element are opposed to an input side of amplifiers 61 and 62. The input side and output side of amplifiers 61 and 62 are electrically insulated by imputing a signal to an OP amplifier after receiving a receiver element through converting a signal of the rotary electric machine 3 supplied voltage from the input side to a luminous signal by the luminous element. A pulse signal wave-form formation circuit 63 makes a wave-form corresponding to the positional signal PS output from positional sensor 33. Low-pass filters 64 and 65 remove a harmonic element from the signals output from amplifiers 61 and 62. Timer 66 prescribes the rotational period of the rotary electric machine. Reference numeral 67 denotes a phase revision CPU, reference numeral 68 denotes a waveform analysis CPU, and reference numeral 69 denotes a main control CPU.

An operational description of an embodiment will now be made. Controller 6 detects when the engine 1 operates with a load, and turbine 21 is driven by the exhaust energy emitted from the engine 1 thus causing compressor 22, which is coupled directly to the turbine, to compress intake air and supply the compressed intake air to the engine 1. In this case, the rotary electric machine 3 coupled directly to the rotatable shaft 23 of turbine 21 operates as a generator and the exhaust energy obtained from the turbine 21 is recovered as generated AC electric power. Controller 6 controls the conversion to DC power and the storage to battery 7 the exhaust gases.

Controller 6 detects declining exhaust gas pressure which declines with declining rotational speed of the engine 1, and declining pressure of compressed air from compressor 22. In this case, controller 6 controls converter 5 to drive the rotary electric machine 3 as a motor. An inverter in electric converter 5 converts the stored DC electric power to AC electric power in order to obtain sufficient pressure of supercharged air by assisting in the rotation of compressor 23.

Figure 4:
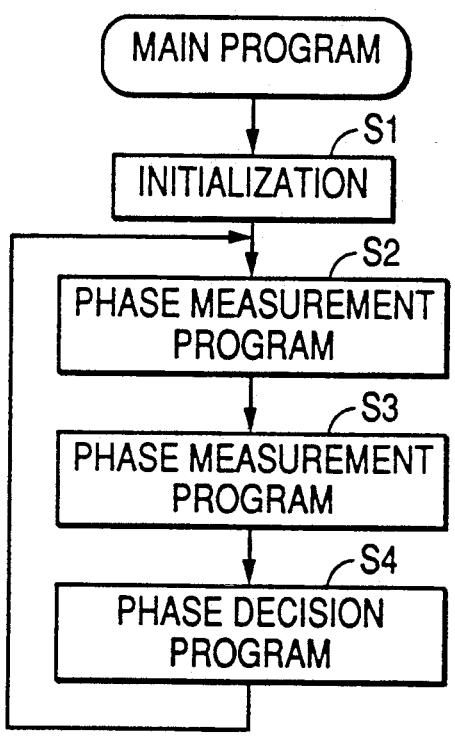
FIG. 4 is a flow chart of a main program.
Figure 5:
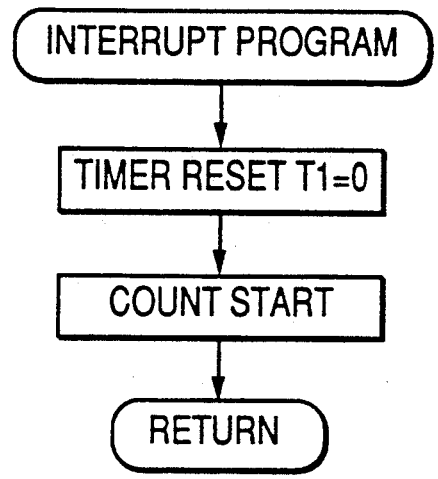
FIG. 5 is a flow chart of an interrupt program.

When the rotary electric machine 3 is rotated by the turbine 21 (i.e., acting as a generator), three phases AC voltage in proportion to the rotational speed of rotary electric engine are generated at source terminals of electric power of the rotary electric machine. This analog voltage of amplifiers 61 and 62 which are insulated between a primary and a secondary circuit is respectively amplified, and a high frequency component (harmonic element) is removed by low-pass filters 64 and 65. Then the analog voltage is converted to a digital signal by A/D converters in wave-form analysis CPU 68 (not shown) and is temporarily stored in a register of wave form analysis CPU 68. The data is renewed every minute. Positional signal PS is input to wave-form analysis CPU 68 and main control CPU 69 after a wave form corresponding to positional signal PS is formed by pulse signal wave-form formation circuit 63. Wave-form analysis CPU 68 always calculates the number of clock pulses between positional signal PS and the next such positional signal SP, and sets the count value as T1, which is provided to timer 66 after receiving the next such positional signal. When the rotary electric machine 3 is not operated by the inverter, that is, main control CPU 69 of controller 6 determines generation is occurring or determines racing by turbine 21, main control CPU 69 executes a main program shown in FIG. 4. During performance of the main program, when a positional signal PS from positional sensor 33 is input to main control CPU 69, an interrupt program shown in FIG. 5 is performed and timer 66 starts count after resetting, and sends a clear signal when timer 66 reaches T1 which was set by wave form analysis CPU 68.

Figure 6:
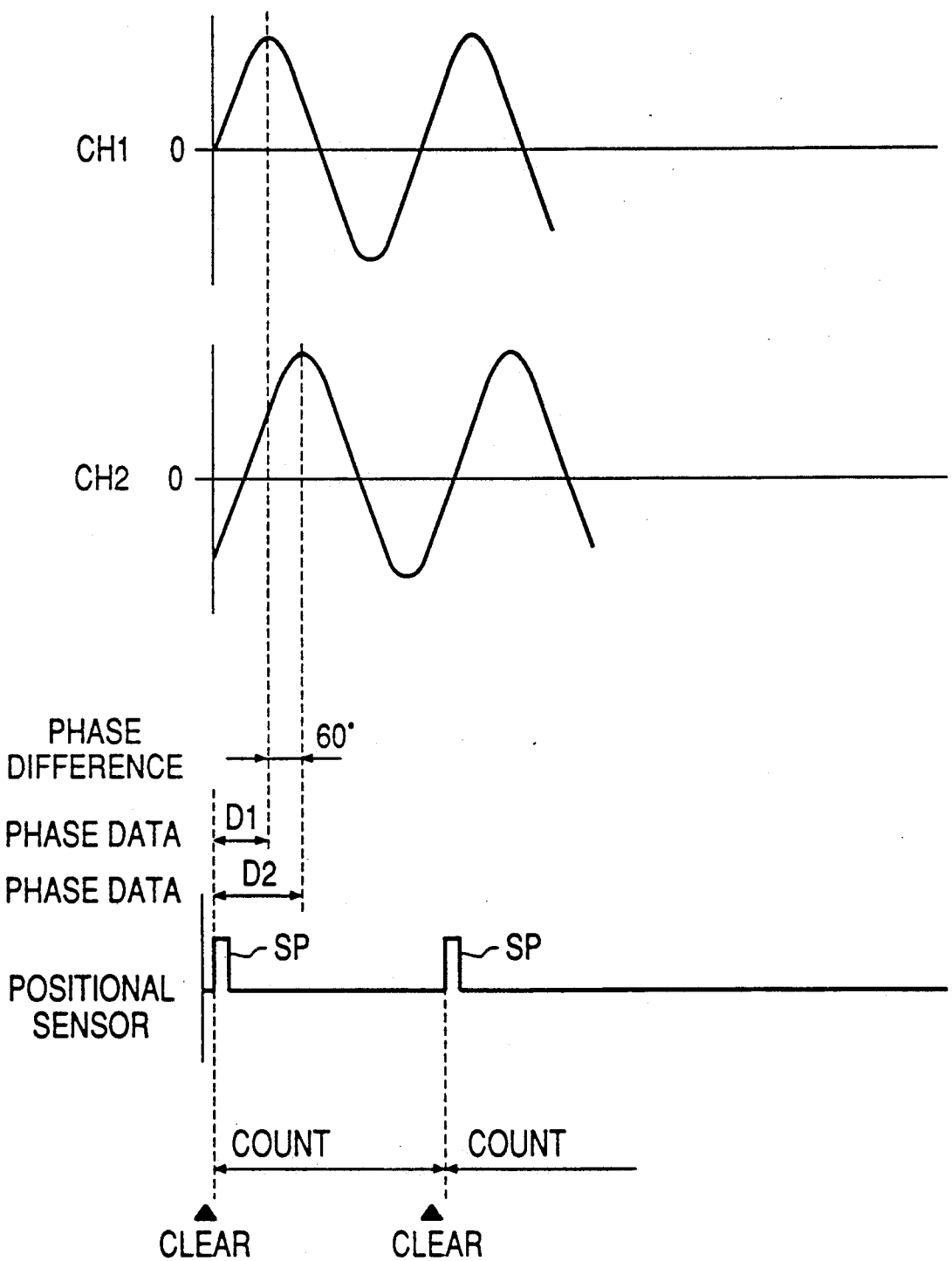
FIG. 6 is a characteristic diagram for operation.

As to S1 of the main program, after initialization of each part of controller 6, CH 1 phase adjustment program is performed for measuring a phase of voltage wave form of U phase corresponding to W phase. The program reads out voltage wave-form indicated in CH 1 shown in FIG. 6, and measures phase D1 up to the maximum wave value from positional signal SP.

With respect to CH 2 phase measurement program, main program S3 executes this program for measuring a phase of voltage wave-form of V phase corresponding to W phase. CH2 phase measurement program reads a voltage wave-form indicated as CH2 of FIG. 6, and determines the maximum wave value. From the maximum wave value and positional signal SP, phase D2 is determined.

Figure 7:
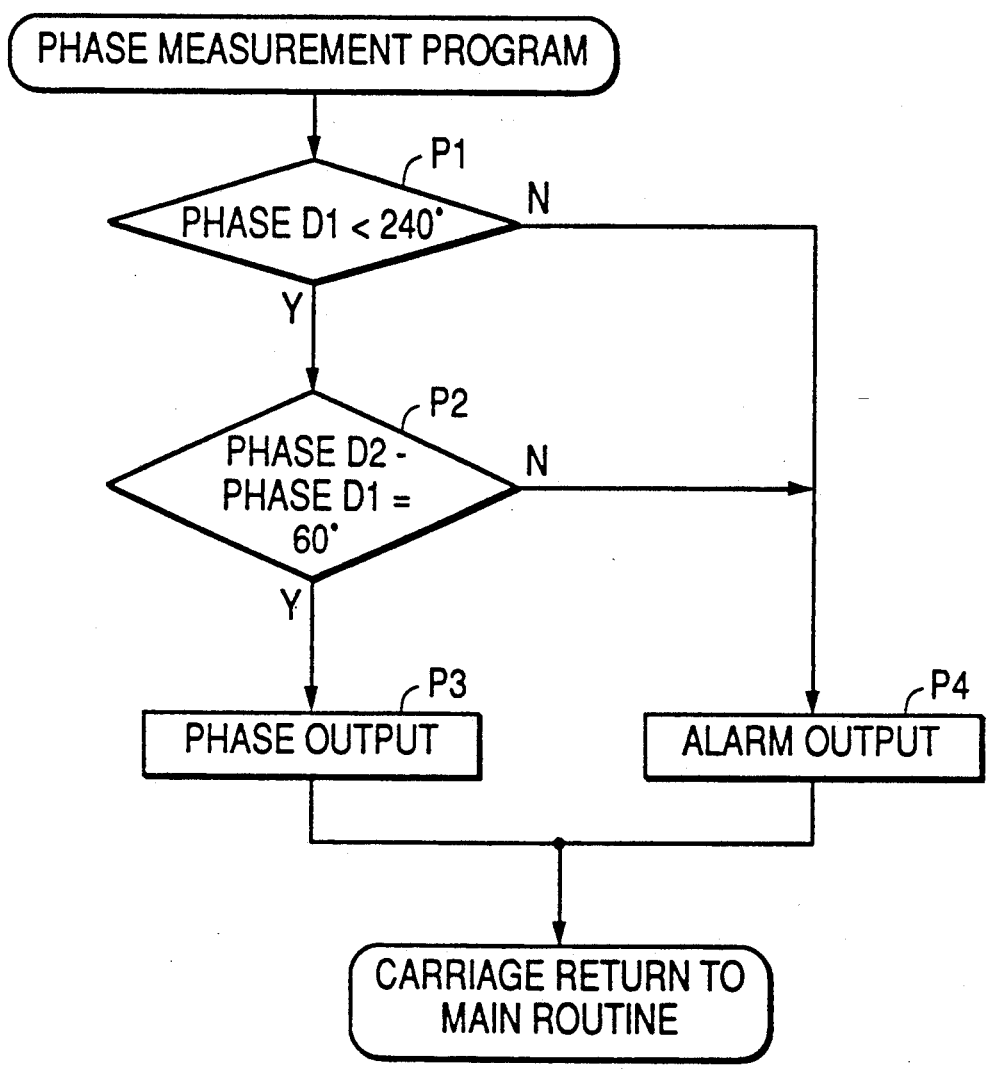
FIG. 7 is a flow chart of a phase order program.

Phase order decision program is then performed by main program S4. The program, as shown in P1 of FIG. 7, decides whether or not the data of phase D1 is less than 240 degrees. In the case where "No" is decided by this decision step, the difference in rotor position determined by positional sensor 33 and that determined by the rotary electric machine 3 indicates a large slip from the initialized position. Hence, an alarm is sent by P4. In a case where "Yes" is decided by this decision step, decision P2 (D2 - D1=60 degree) is performed. In a case where "No" is decided by decision step P2, this indicates failure of positioning between positional sensor 33 and rotor of the rotary electric machine 3 or rotor or stator and an alarm is sent by P4.

When "Yes" is decided by P2, as indicated at P3, phase D1 measured in S2 of the main program is stored in a register of main control CPU 69 for returning to the main routine.

According to the instructions from controller 6, when the rotary electric machine 3 is operated as a motor, three phase AC electric power for operating the rotary electric machine 3 is produced from electric power converter 5 for supplying voltage to rotary electric machine 3.

Although certain preferred embodiments have been shown and described, it should be understood that many changes and modifications may be made therein without departing from the scope of the appended claims.

As described above, according to the present invention, since the system of the present invention can always measure the phase for a rotary electric machine, and will send an alarm immediately when the phase gets out of order. Thus, the electric power converter is not damaged. Furthermore, when the drive system of a conventional turbocharger is loaded or replaced on a motor vehicle, phase adjustment is not required. Accordingly, the present invention largely contributes to simplifying operation and reducing operational costs.

What is claimed is:

1. A system for driving an electric machine mounted on a shaft in a turbocharger, said electric machine functions as a generator or as an electric motor, said system comprising:

positional sensor means for mechanically predicting an initialized position of phase of the electric machine;

phase detective means for electrically predicting the initialized position of phase of the electric machine;

first calculation means for calculating the difference between the mechanically predicted initialized position and the electrically predicted initialized position; and second calculation means for adding the difference calculated by the first calculation means to the mechanically predicted initialized position of phase to derive an initialized position of phase to be used for producing AC electric power to drive the electric machine when it functions as an electric motor.

2. A system according to claim 1, further comprising alarm means for producing an alarm signal when the difference calculated by the first calculation means exceeds a predetermined value.

* * * * *